United States Patent [19]
Evans et al.

[11] Patent Number: 5,993,673
[45] Date of Patent: Nov. 30, 1999

[54] PURIFICATION PROCESS

[75] Inventors: Thomas I. Evans, Glenmoore; David W. Leyshon, West Chester, both of Pa.

[73] Assignee: Arco Chemical Technology, L.P., Greenville, Del.

[21] Appl. No.: 09/160,004

[22] Filed: Sep. 24, 1998

[51] Int. Cl.$^6$ ...................................................... C02F 1/58
[52] U.S. Cl. ............................................ 210/763; 210/766
[58] Field of Search .................................... 210/762, 763, 210/765, 766

[56] References Cited

U.S. PATENT DOCUMENTS

| | | | |
|---|---|---|---|
| 3,282,702 | 11/1966 | Schreiner | 210/763 |
| 3,351,635 | 11/1967 | Kollar | 260/348.5 |
| 4,629,571 | 12/1986 | Salem et al. | 210/763 |
| 4,879,047 | 11/1989 | Jackson | 210/763 |
| 5,205,906 | 4/1993 | Grutsch et al. | 210/762 |
| 5,374,599 | 12/1994 | Ishii et al. | 210/763 |
| 5,460,792 | 10/1995 | Rosenbaum | 210/763 |

*Primary Examiner*—Thomas G. Wyse
*Attorney, Agent, or Firm*—William C. Long

[57] ABSTRACT

A propylene oxide/styrene monomer aqueous purge stream is contacted with a solid iron promoted alumina catalyst at conditions effective to decompose peroxides contained therein.

4 Claims, 1 Drawing Sheet

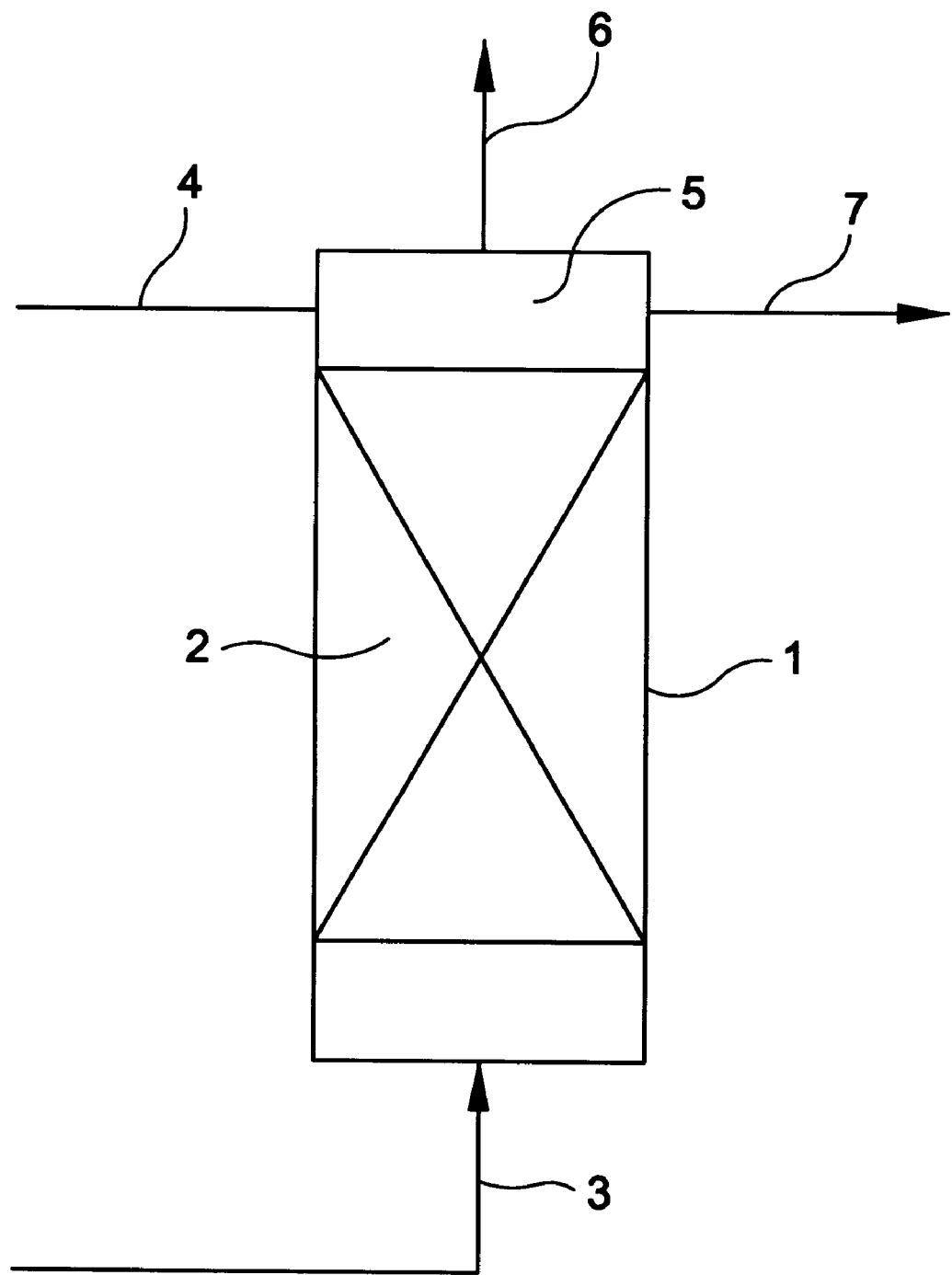

PURIFICATION PROCESS

BACKGROUND OF THE INVENTION

1. Field of the Invention

The present invention relates to a process for removing peroxides from peroxide containing aqueous waste streams such as those from the propylene oxide/styrene monomer technology so that the treated stream can be further processed prior to its disposal.

2. Description of the Prior Art

The Oxirane process for the production of propylene oxide and styrene monomer is a process of very great commercial importance. The basic patent describing this process is U.S. Pat. No. 3,351,635. In the process, ethylbenzene is oxidized to ethylbenzene hydroperoxide, the ethylbenzene hydroperoxide is catalytically reacted with propylene to form propylene oxide and 1-phenyl ethanol, and the 1-phenyl ethanol is dehydrated to form styrene monomer.

In practice of the process there are a number of separation and recovery steps and various purge streams are formed which must be disposed of in the face of ever increasing environmental concerns. In various instances, disposal practices which were permitted in the past may, in the future, no longer be permitted. Accordingly, considerable efforts are being directed to bring about improvements in procedures used to treat propylene oxide/styrene monomer purge streams.

One such purge stream is an acidic wastewater removed as a distillation sidestream. The acidic wastewater contains in addition to water and various organic acids, significant amounts of ethylbenzene and peroxidic materials. Consideration has been given to biotreatment of such streams but the contained ethylbenzene tends to flash in a biopond exceeding VOC limits. First stripping ethylbenzene before biotreatment is an option but this would result in dangerous concentrations of peroxides forming within the stripper.

Chemical treatment such as with caustic to decompose the peroxides is an option. However, such treatment is costly and yields a salty stream that is more difficult to biotreat. Chemical treatment as with homogeneous catalysts is possible but is more costly due to chemical usage and mixing and metering equipment. The chemicals added may also result in environmental issues downstream especially if it is necessary to increase the pH.

Decomposition of peroxides in acidic environments is possible via heterogeneous catalysis. Certain activated carbons, for example, have been demonstrated to work. However, such systems are known to have plugging problems because the evolved oxygen bubbles attach to the fines and promote their agglomeration. Also, the carbon tends to adsorb other organics in the stream and deactivate over time. Lastly, oxidation of the carbon itself might occur in "hot spots" throughout the catalyst bed, or even local combustion of carbon.

SUMMARY OF THE INVENTION

In accordance with the invention, aqueous process streams containing organic acids, peroxidic materials and ethylbenzene are contacted with a solid catalyst comprised of iron promoted alumina at conditions effective to decompose the peroxidic materials. It is particularly advantageous to accomplish the peroxide destruction at low pH values with this invention so that further processing is enabled. Thereafter, such ethylbenzene as is not oxidized during the decomposition and peroxide decomposition products can be safely stripped from the treated stream leaving a residual aqueous stream which can be effectively biotreated.

BRIEF DESCRIPTION OF THE DRAWING

The attached drawing illustrates schematically practice of the invention.

DETAILED DESCRIPTION

The process of the invention is especially applicable to treatment of aqueous acidic purge streams from propylene oxide/styrene monomer production. Such streams are predominantly comprised of water, organic acids, peroxidic components, and ethyl benzene. Generally the purge streams comprise by weight at least 70% water, up to 20% peroxidic components, up to about 30% organic acids, and up to about 3% ethylbenzene. Generally the pH is about 1.5–3.

In accordance with the invention, the purge stream in the liquid phase is contacted with a solid particulate catalyst comprised of alumina containing by weight up to about 15% iron expressed as $Fe_2O_3$, preferably 1–15% by weight. Specially preferred are high surface area materials, for example materials having a surface area of at least about 100 $m^2/g$. An especially suitable catalyst is Purocel SG or Purocel RI available from Porocel composition. The following are illustrative characteristics of these catalysts:

| Purocel RI | |
|---|---|
| Typical Chemical Analysis (Dry Basis): | |
| Al2O3: | 77.7% |
| SiO2: | 10.8% |
| Fe2O3: | 6.5% |
| TiO2: | 5.0% |
| Typical Physical Properties: | |
| Loss on Ignition: | 5.69% |
| Surface Area: | 234.67 $m^2/g$ |
| Bulk Density: | 59.42 lb/ft3 |
| Particle Size: | Plus 10-plus 20 (U.S. Screens) |

| Purocel SG | |
|---|---|
| Typical Chemical Analysis (Dry Basis): | |
| Al2O3: | 77.7% |
| SiO2: | 10.8% |
| Fe2O2: | 6.5% |
| TiO2: | 5.0% |
| Typical Physical Properties | |
| Loss on Ignition: | 8.83% |
| Surface Area: | 196.51 $m^2/g$ |
| Bulk Density: | 62.40 lb/ft3 |
| Crush Strength: | 18.60 lbs |
| Macroporosity (>750A): | 0.0257 cc/gram |
| Particle Size: | Plus 8-plus 16 (U.S. Screens) |

The liquid purge stream containing peroxidic materials is contacted with the particulate catalyst at temperatures ranging from about 50° F. to the boiling point of the purge stream, preferably 100–200° F. Peroxide decomposition is faster and more complete at higher temperatures and these are preferred. Near atmospheric pressure is preferred although pressure can vary widely. Peroxide decomposition is usually more difficult at higher pressures.

The contact is continued for a time sufficient to decompose most and preferably substantially all of the contained peroxidic materials, eg. 2–200 minutes, preferably 5–100 minutes.

An especially advantageous feature of the inventive process is that highly acidic aqueous streams can be treated without the need for costly pH adjustment using caustic.

The exact nature and composition of the peroxidic contaminants can vary. Generally, hydrogen peroxide is the main peroxidic contaminant along with lesser amounts of methyl hydroperoxide, ethyl hydroperoxide, propyl di-hydroperoxide, and the like.

In order to illustrate the advantageous features of the invention, a synthetic purge stream was prepared containing by weight 2% formic acid, 6% acetic acid and 92% deionized water. About 930–931 ppm by weight hydrogen peroxide was added and samples of the synthetic purge stream were contacted with 10 wt % Purocel SG based on the purge stream charged at various temperatures with hydrogen peroxide content being measured as a function of time. The results are given in the following table:

TABLE 1

| Expt. # | pH Final | T (° F.) | Sample Time (min) | Sample [$H_2O_2$] (ppm) |
|---|---|---|---|---|
| 1 | 2.7 | 139 | 0 | 930 |
|   |     |     | 1 | 544 |
|   |     |     | 5 | 557 |
|   |     |     | 10 | 508 |
|   |     |     | 20 | 359 |
|   |     |     | 40 | 155 |
|   |     |     | 80 | 5 |
| 2 | 2.8 | 158 | 0 | 931 |
|   |     |     | 1 | 569 |
|   |     |     | 5 | 456 |
|   |     |     | 10 | 365 |
|   |     |     | 20 | 206 |
|   |     |     | 40 | 38 |
|   |     |     | 80 | 11 |
| 3 | 2.83 | 176 | 0 | 930 |
|   |     |     | 1 | 544 |
|   |     |     | 5 | 380 |
|   |     |     | 10 | 292 |
|   |     |     | 20 | 77 |
|   |     |     | 40 | 5 |
| 4 | 2.93 | 194 | 0 | 930 |
|   |     |     | 1 | 505 |
|   |     |     | 5 | 309 |
|   |     |     | 10 | 81 |
|   |     |     | 20 | 5 |

The above results clearly demonstrate the effectiveness of peroxide decomposition using the high iron alumina catalyst, especially at the higher temperatures. By way of contrast, when similar experiments were carried out with alumina which did not contain substantial iron, little peroxide decomposition took place even over extended periods at 90° C.

In general, in batch operation the use of solid catalyst in amount ranging from 5 to 50 wt % based on feed is suitable.

In order to more clearly illustrate the invention, the following working example is presented with reference to the FIGURE.

A wastewater side stream from a propylene oxide/styrene monomer process comprised by weight of about 2% formic acid, about 5% acetic acid, about 0.7% propionic acid, a small amount of benzoic acid, about 0.1% ethylbenzene, and about 9% of the combination of hydrogen peroxide, methyl hydroperoxide, ethyl hydroperoxide, propyl dihydroperoxide, and about 83% water is fed via line 3 to reactor 1 at the rate of 1000 lbs/hr.

Reactor 1 is packed in zone 2 with particulate catalyst comprised of alumina containing up to about 15% iron as $Fe_2O_3$. The stream is passed through the catalyst bed at a liquid hourly space velocity of 0.6 lbs of liquid stream per lb of solid catalyst. Temperature is maintained at about 90° C. and pressure is atmospheric.

Nitrogen sweep gas is introduced via line 4 to the upper section 5 of reactor 1 and nitrogen plus oxygen formed by decomposition of the peroxidic materials is removed via line 6.

As a result of this treatment, the stream exiting from the reactor 1 via line 7 contains less than 10 ppm by weight of peroxidic materials illustrating the effectiveness of the process. The treated stream is stripped of ethylbenzene and passed to a biopond for final treatment.

We claim:

1. A process for purifying an aqueous purge stream from propylene oxide/styrene monomer production containing organic acids, peroxidic materials and ethylbenzene which comprises contacting the purge stream with a particulate solid catalyst comprised of iron promoted alumina at conditions effective to decompose peroxidic materials, and recovering the treated stream reduced in peroxide content.

2. The process of claim 1 wherein the aqueous purge stream has a pH of 1.5–3.

3. The process of claim 1 wherein the aqueous purge stream contains up to 15 wt % peroxidic materials.

4. The process of claim 1 wherein the catalyst contact is at 50° F. to the boiling point of the purge stream.

* * * * *